(12) United States Patent
Bourjal (10) Patent No.: US 7,441,656 B2
(45) Date of Patent: Oct. 28, 2008

(54) ARTICLE COMPRISING COMPOSITE MATERIAL AND METHOD OF MAKING THE ARTICLE

(75) Inventor: Laur Bourjal, Clichy (FR)

(73) Assignee: L'Oreal S.A., Paris (FR)

( * ) Notice: Subject to any disclaimer, the term of this patent is extended or adjusted under 35 U.S.C. 154(b) by 473 days.

(21) Appl. No.: 10/192,718

(22) Filed: Jul. 11, 2002

(65) Prior Publication Data

US 2003/0077102 A1 Apr. 24, 2003

(30) Foreign Application Priority Data

Jul. 11, 2001 (FR) .................................. 01 09217

(51) Int. Cl.
 B65D 85/72 (2006.01)
(52) U.S. Cl. ...................... 206/385; 206/581
(58) Field of Classification Search ................. 206/385, 206/581, 823, 484, 484.1, 484.2; 383/109, 383/112, 114, 116; 428/34.5, 35.7, 36.1, 428/36.5
 See application file for complete search history.

(56) References Cited

U.S. PATENT DOCUMENTS

| 1,223,074 | A | 4/1917 | Kantrowitz |
|---|---|---|---|
| 1,502,013 | A | 7/1924 | Benois |
| 1,693,563 | A | 11/1928 | Müller |
| 2,035,384 | A | 3/1936 | Hinchliff |
| D124,653 | S | 1/1941 | Kane |
| D124,949 | S | 2/1941 | Botham |
| D126,813 | S | 4/1941 | Karoff |
| D157,793 | S | 3/1950 | Salisbury |
| 2,527,339 | A | 10/1950 | Tamoschat |
| D183,749 | S | 10/1958 | Kent |
| D183,750 | S | 10/1958 | Kent |
| 3,181,693 | A * | 5/1965 | Freistat .................. 206/523 |
| 3,507,416 | A | 4/1970 | Douglas et al. |
| 3,858,718 | A | 1/1975 | Roy |
| 4,018,237 | A * | 4/1977 | Steiman .................. 132/303 |
| D260,564 | S * | 9/1981 | Jedzinak et al. .............. D28/89 |
| 4,461,332 | A * | 7/1984 | Parkhurst .................. 150/112 |
| 4,649,974 | A * | 3/1987 | Takanashi .................. 150/100 |
| 4,816,000 | A | 3/1989 | Hsu |
| 4,836,374 | A * | 6/1989 | Hutchins et al. ............ 206/373 |

(Continued)

FOREIGN PATENT DOCUMENTS

EP 0 707 955 4/1996

(Continued)

OTHER PUBLICATIONS

Co-pending U.S. Appl. No. 09/902,265; Title: Cosmetics Product Inventor(s): Vincent De Laforcade, filed Jul. 11, 2001 Preliminary Amendment Filed: Jul. 1, 2002.

(Continued)

*Primary Examiner*—David T Fidei
(74) *Attorney, Agent, or Firm*—Finnegan, Henderson, Farabow, Garrett & Dunner, L.L.P.

(57) ABSTRACT

An article may comprise a hollow body made of a composite material element comprising a deformable layer and a stretchable covering attached to the deformable layer. The hollow body may have an axial dimension that is not less than a maximum transverse dimension. Also, the hollow body may be associated with a cosmetic product.

84 Claims, 3 Drawing Sheets

U.S. PATENT DOCUMENTS

| | | | |
|---|---|---|---|
| 4,884,704 A | 12/1989 | Spector | |
| 4,934,534 A | 6/1990 | Wagner | |
| 4,964,509 A * | 10/1990 | Insley et al. | 206/204 |
| 5,178,198 A * | 1/1993 | Fitzgerald | 150/107 |
| D351,487 S | 10/1994 | Chen | |
| 5,431,970 A * | 7/1995 | Broun et al. | 428/36.5 |
| 5,451,113 A * | 9/1995 | Lund et al. | 401/98 |
| 5,503,204 A * | 4/1996 | Byers et al. | 150/105 |
| D370,341 S * | 6/1996 | Azar et al. | D3/233 |
| 5,639,523 A * | 6/1997 | Ellis | 428/34.2 |
| 5,713,471 A | 2/1998 | Gueret | |
| 5,730,294 A | 3/1998 | Blosser et al. | |
| D403,123 S | 12/1998 | Sgariboldi | |
| 5,882,116 A * | 3/1999 | Backus | 383/5 |
| 5,978,777 A | 11/1999 | Garnier | |
| 5,983,201 A | 11/1999 | Fay | |
| D417,932 S | 12/1999 | Siegel et al. | |
| D423,299 S | 4/2000 | Burrus | |
| 6,055,992 A | 5/2000 | Skarne | |
| 6,068,401 A * | 5/2000 | Ho | 383/97 |
| D431,683 S | 10/2000 | Hillock | |
| 6,179,025 B1 * | 1/2001 | Sutton | 150/105 |
| D440,828 S | 4/2001 | Burrus | |
| 6,234,307 B1 * | 5/2001 | Beck | 206/315.9 |
| 6,446,809 B2 * | 9/2002 | Flynn | 206/523 |
| 7,047,983 B2 * | 5/2006 | Manougian et al. | 132/294 |
| 2003/0010350 A1 * | 1/2003 | De Laforcade | 132/294 |

FOREIGN PATENT DOCUMENTS

| | | |
|---|---|---|
| EP | 1281333 | 2/2003 |
| FR | 2 674 183 | 9/1992 |
| FR | 2 796 329 | 1/2001 |
| JP | 54-113682 | 9/1979 |
| JP | 57-27208 | 2/1982 |
| JP | 58-90035 | 5/1983 |
| JP | 59-85745 | 5/1984 |
| JP | 62-83313 | 5/1987 |
| JP | 64-8313 | 1/1989 |
| JP | 5-9412 | 2/1993 |
| JP | 11-56459 | 3/1999 |

OTHER PUBLICATIONS

Co-pending U.S. Appl. No. 09/902,092; Title: Foam Core Cosmetic Case Inventor(s): Vincent De Laforade, filed Jul. 11, 2001.

English language Derwent Abstract of FR 2 674 183, Sep. 25, 1992.

English language Derwent Abstract of FR 2 796 329, Jan. 19, 2001.

* cited by examiner

FIG_1

FIG_2

FIG_3

FIG_4

FIG_5

FIG_6

FIG_7

FIG_8

ARTICLE COMPRISING COMPOSITE MATERIAL AND METHOD OF MAKING THE ARTICLE

DESCRIPTION OF THE INVENTION

Technical Field

The present invention relates to articles made of composite materials and used to form hollow bodies, such as for outer shells of containers, dispensers, covers and the like. The invention further relates to articles associated with cosmetic products. The invention also relates to a method of making such articles.

SUMMARY

In an exemplary aspect of the invention, the articles may provide product a container that is attractive in appearance.

It should be understood that the invention could be practiced without performing the exemplary aspect described above. Other exemplary aspects will become apparent from the detailed description which follows.

As embodied and broadly described herein, in an exemplary aspect, the invention includes an article comprising a hollow body having a maximum transverse dimension and an axial dimension that is not less than the maximum transverse dimension. The hollow body may be made at least in part from a composite material element comprising a deformable layer and a stretchable covering attached to the deformable layer.

According to another exemplary aspect, the invention may include an article comprising a hollow body comprising a deformable layer and a stretchable covering attached to the deformable layer. The article may further comprise a cosmetic product associated with the hollow body.

The hollow body may be one of cold-deformed and a hot-deformed. The deformable layer may be a thermally deformable layer, for example a hot-deformable layer or a cold-deformable layer.

The deformable layer may comprise a foam layer in contact with the covering in an exemplary embodiment, the stretchable covering may comprise a fabric, for example, an elastomeric fabric, such as Lycra or other suitable fabric. The fabric may have a substantially uniform color or may comprise threads of differing colors. In the latter case, deforming the composite material element may cause the fabric to stretch and configure stripes, or another pattern, on an exterior surface of the hollow body.

According to an exemplary aspect, the article may comprise a mask and the hollow body may be configured to engage the mask. A free edge of the hollow body may define an opening and the mask may be configured to engage the free edge of the hollow body. In an exemplary embodiment, the mask may comprise a ring-shaped element. In an alternative exemplary embodiment, the mask may comprise a rim of an insert configured to be received within the hollow body.

The article may further comprise a closure mechanism configured to be disposed in an interior of the hollow body. The closure mechanism may be configured to be associated with an insert configured to be received in the interior of the hollow body. According to an exemplary aspect, the closure mechanism may be configured to close an opening of a receptacle configured to hold a product. As an example, the closure mechanism may be configured to cooperate with a dispensing mechanism of the receptacle.

The hollow body may be configured to form a cover element for a product dispenser. In an exemplary embodiment, the product dispenser may be for dispensing a cosmetic product (e.g., a makeup product). For example, the product may be adapted to be applied to at least one of skin, nails, lips, and hair. In an exemplary embodiment, the product may be chosen from a lip make-up product and a lip care produce.

The article may further comprise another hollow body having substantially the same configuration as the hollow body configured to form the cover element for the product dispenser.

According to an exemplary aspect, the axial dimension of the hollow body is greater than the maximum transverse dimension of the hollow body. The axial dimension of the hollow body may not be less than approximately 2.5 cm and the maximum transverse dimension may be not less than approximately 2.5 cm. In another exemplary aspect, the maximum transverse dimension may be a diameter of the hollow body.

The hollow body may have a free edge defining an opening and the maximum transverse dimension may be a diameter of the opening.

According to yet another exemplary aspect, the hollow body may be configured to form an outer shell for a receptacle cover element. The hollow body also may be configured to form an outer shell of a receptacle. In an exemplary embodiment, the hollow body may be configured to define a reservoir for holding a product.

The deformable layer may comprise a foam layer having closed cells. As an example, the deformably layer may comprise a foam layer made of polyolefin. The foam layer may be made of polyethylene, for example, and may have a density greater than approximately 50 kg/m$^2$. The polyethylene may be a cross-linked polyethylene, for example.

The deformable layer may comprise a first face to which the stretchable covering may be attached and a second face opposite the first face. At least one layer of a thermoformable material may be attached to the second face. The thermoformable material may comprise polyolefin, for example. As another example, the thermoformable material may comprise polyethylene. Other suitable materials also may be used for the at least one layer and are contemplated as being within the scope of the invention.

In an exemplary embodiment, the at least one layer may be configured to at least partially cover at least a portion of a free edge of the hollow body.

According to yet another exemplary aspect, the article may further comprise a closure mechanism configured to be attached to the at least one layer such that the closure mechanism is disposed within an interior of the hollow body.

The hollow body may comprise an interior surface and an exterior surface and the stretchable covering may form the exterior surface.

In an exemplary aspect, the composite material element may be a substantially planar element.

The hollow body may be formed by deforming the composite material element. For example, the hollow body may be formed by one of hot-deforming and cold-deforming the composite material element.

The stretchable covering may be attached to the deformable layer by any suitable mechanism, such as, for example, by gluing, welding, or other mechanisms for attaching.

According to another exemplary aspect, the invention may include a device for dispensing a product comprising at least one outer shell comprising a hollow body such as those discussed above.

The device may further comprise a receptacle defining at least one opening and a cover element for covering the opening. The at least one outer shell may form at least a portion of the cover element.

The device may further comprise a second outer shell that may form at least a portion of the receptacle.

According to an exemplary aspect, the device may comprise a receptacle defined at least partially by the at least one outer shell. Further, the device may comprise a product, such as a cosmetic product, for example, in the receptacle. For example, the product in the receptacle may be chosen from a lip make-up product and a lip care product.

According to an exemplary aspect, the device may be configured to dispense a cosmetic product (e.g., a make-up product).

Yet another exemplary aspect of the invention includes a method of making an article comprising producing a composite material element comprising a deformable layer and a stretchable covering attached to the deformable layer. The method may further comprise deforming the composite material element in such a manner so as to obtain a hollow body having a maximum transverse dimension and an axial dimension that is not less than the maximum transverse dimension.

In another exemplary aspect, the invention may include a method of making an article comprising providing a composite material element comprising a deformable layer and a stretchable covering attached to the deformable layer. The method may further comprise deforming the composite material element in such a manner so as to obtain a hollow body and associating a cosmetic product with the hollow body.

The term "providing" is used broadly, and refers to, but is not limited to, making available for use, giving, supplying, obtaining, getting a hold of, acquiring, purchasing, selling, distributing, possessing, manufacturing, assembling, making ready for use, and/or placing in a position ready for use.

The hollow body may be configured to form an outer shell of a dispenser and associating the cosmetic product with the hollow body may comprise providing the cosmetic product in the dispenser. As an alternative, associating the cosmetic product with the hollow body may comprise providing the cosmetic product within a reservoir defined by the hollow body.

The axial dimension of the hollow body may be greater than the maximum transverse dimension of the hollow body.

In another exemplary aspect, the method may further comprise engaging the hollow body with a mask. As an example, the hollow body may have a free edge defining an opening and engaging the hollow body with the mask may comprise engaging the free edge with the mask.

The engaging may comprise force-fitting the free edge of the hollow body in the mask such that the mask is held by the hollow body being clamped by the mask. The use of adhesive may thus be avoided and manufacture may be simplified. However, adhesive also may be used to secure the mask to the hollow body free edge.

In an exemplary embodiment, the stretchable covering comprises a fabric, which may comprise threads having differing colors. Deforming the composite material element comprising such a fabric may configure stripes on an exterior surface of the hollow body due to stretching of the covering.

The method may further comprise compressing the deformable layer of the composite material element. The compressing of the deformable layer may occurs during the deforming of the composite material element, for example.

In an exemplary aspect, deforming the composite material element may comprise thermally deforming the composite material element. For example, deforming the composite material element may comprises hot-deforming or cold-deforming the composite material element.

The method may further comprise disposing a closure mechanism in an interior of the hollow body and the closure mechanism may be configured to close a receptacle configured to hold a product.

According to yet another exemplary aspect, the invention may include a method of making an outer shell of a cosmetic device comprising providing a composite material element comprising a deformable layer and a stretchable covering attached to the deformable layer. The method may further comprising deforming the composite material element, in such a manner so as to obtain a hollow body having a maximum transverse dimension and an axial dimension that is not less than the maximum transverse dimension, the hollow body forming the outer shell.

The hollow body may form the outer shell of at least one of a receptacle portion of a cosmetic product dispenser and a cover element of the cosmetic product dispenser.

According to an exemplary aspect, it may be possible to impart the above-mentioned shape to the hollow body without tearing the stretchable covering. In the past, it was thought that the stretchable covering would be torn.

In one example, the method may further comprise selecting the covering in such a manner so as to obtain a predefined appearance on the hollow body after the composite material element has been deformed.

Besides the structural and procedural arrangements set forth above, the invention could include a number of other arrangements, such as those explained hereinafter. It is to be understood that both the foregoing description and the following description are exemplary.

The accompanying drawings are included to provide a further understanding of the invention and are incorporated in and constitute a part of this specification. The drawings illustrate exemplary embodiments of the invention and, together with the description, serve to explain certain principles. In the drawings,

DETAILED DESCRIPTION

Reference will now be made in detail to exemplary embodiments of the invention, examples of which are illustrated in the accompanying drawings. Wherever possible, the same reference numbers are used in the drawings and the description to refer to the same or like parts, and the same reference numbers with alphabetical suffixes are used to refer to similar parts.

Figure 1:
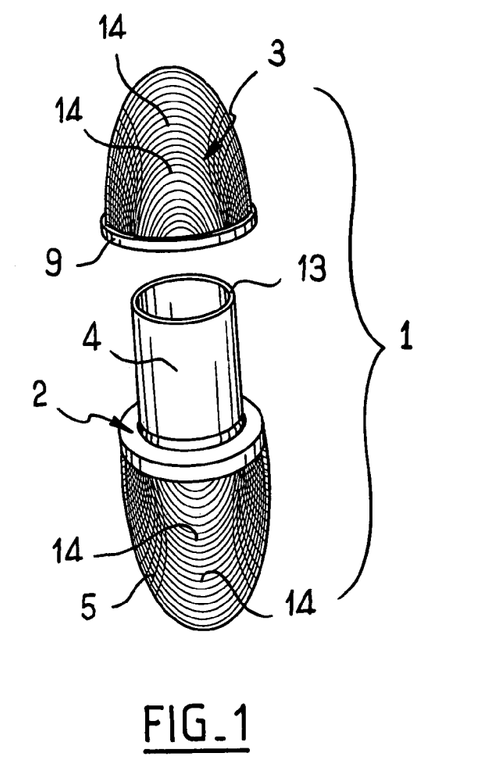
FIG. 1 is a perspective view of an exemplary embodiment of a lipstick dispenser comprising two shell elements.

FIG. 1 shows an exemplary embodiment of lipstick dispenser 1 comprising a dispensing mechanism 2 and a cover element 3.

The dispensing mechanism 2 comprises a base portion 5 and a ferrule 4. The ferrule 4 is capable of turning relative to the base portion 5 in order to make a lipstick-carrying plate (not shown) move up or down.

Figure 2:
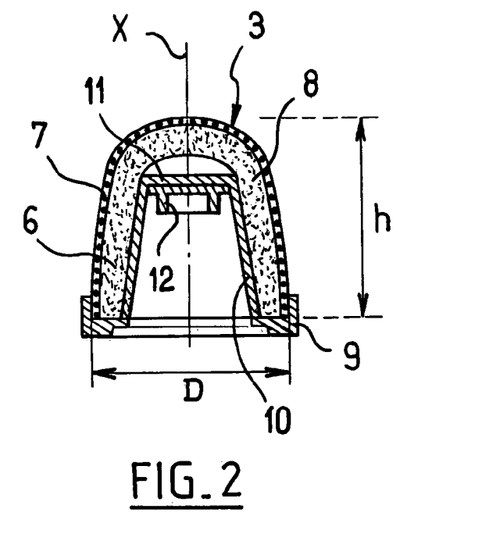
FIG. 2 is an axial section view of an exemplary embodiment of the cover element of FIG. 1.
Figure 3:
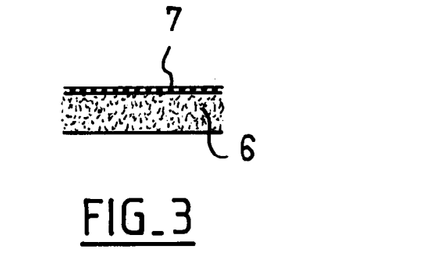
FIG. 3 is a cross-sectional view of an exemplary embodiment of a composite material element used to make the outer shell portion of the cover element of FIG. 2.

Each of the base portion 5 and the cover element 3 comprises a respective hollow body 11, which is made from a composite material element comprising a relatively stiff foam layer 6 lined with a stretchable covering 7, as shown in FIGS. 2 and 3. In this example, the covering 7 may be made of a Lycra® fabric, but is not beyond the ambit of the present invention to use other types of covering, such as a stretchable non-woven fabric or other suitable materials, for example. By way of example, the initial thickness of the foam layer 6 may be about 5 millimeters and the layer 6 may have a density greater than 50 kilograms per square meter ($kg/m^2$), for example approximately 70 $kg/m^2$. In an exemplary embodiment, the foam 6 may be crosslinked polyethylene. Other similar types of materials also may be used and are considered within the scope of the invention. Similarly, the density and thickness of the deformable layer may be chosen based on factors such as the desired shape of the hollow body, the material used for the layer, and the type of process used to deform the composite material element, for example.

Figure 4:
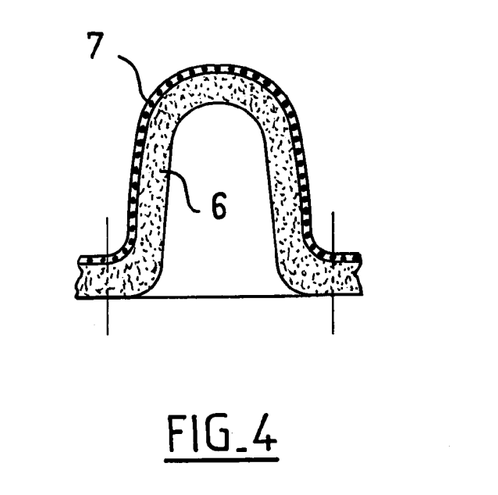
FIG. 4 is a cross-sectional view of the composite material element of FIG. 3 after thermoforming.

In one example, in order to make the hollow body 11, a composite material element comprising the layer 6 and the covering 7 may be deformed via hot thermocompression, for example, so as to give it a glove-finger shape, as shown in FIG. 4. In the exemplary embodiment of FIG. 4, the shape is substantially circularly symmetrical. In FIG. 4, the line where the composite material element is cut after it has been thermoformed is represented by dashed lines. The open end of the hollow body 11 may then be force-fitted under radial compression into a mask 9 so as to hide the free edge of the hollow body 11. The mask 9 may be formed by a metal ring as shown in FIG. 2. As can be seen in FIG. 2, the axial dimension, e.g., height h, of the hollow body 11 is not less than its maximum transverse dimension, referenced by outside diameter D. In one example, the height h of the body 11 is greater than 2.5 centimeters (cm), and its maximum diameter D is less than 2.5 cm.

An adhesive can optionally be applied to the contact surface between the hollow body 11 and the mask 9, but in certain circumstances, merely clamping the hollow body 11 in the mask 9 suffices to hold the mask 9 on the hollow body 11.

In FIG. 2, an insert 10, having the shape of a truncated cone with a closed top, may be inserted in the hollow body 11 before fixing the hollow body 11 to the mask 9. A closure mechanism, such as a cap 12, may be fixed to an inside of the end wall of the insert 10. The cap 12 may have an annular lip that is suitable for being engaged via a friction fit within the opening 13 of the dispensing mechanism 2 in order to hold the cover element 3 on the dispensing mechanism 2 while it is not in use. Other types of closure mechanisms, such as a snap-fastener, for example, also may be used.

It can be seen from FIG. 1, that deforming the composite material element 6, 7 may cause stripes 14 to appear on the cover element 3. This effect may result when the stretchable covering 7 is made of a fabric comprising threads of differing colors. This may contribute to the overall appearance of the holder 1. Other patterns besides stripes may also be formed depending on the type and pattern on the fabric prior to deforming the composite material element.

Figure 5:
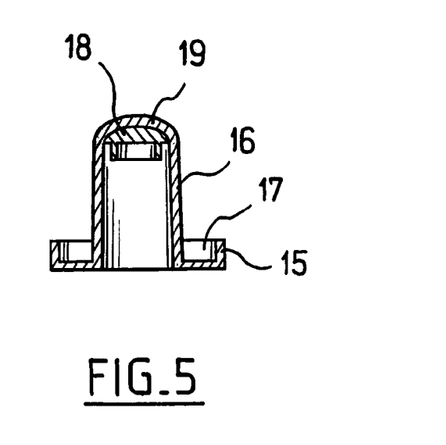
FIG. 5 is a cross-sectional view of an exemplary embodiment of a mask onto which the hollow body formed from the composite material element of FIG. 3 may be attached.

The hollow body 11 also may be fixed on an element that includes a mask and an insert made in a single piece, as shown, for example, in FIG. 5. The element may comprise a mask-forming rim 15 and a central chimney 16 serving as an insert. The element may be closed at its top end by a rounded end wall 19. Between them, the rim 15 and the chimney 16 may define a groove 17 that may be suitable for receiving the free edge of the hollow body 11. A closure mechanism, which again may be in the form of a cap 18 having a top face that is convex, may be fixed against the rounded end wall 19 inside the chimney 16. The rounded end wall 19 may come into contact with the top region of the inside face of the hollow body 11.

Figure 6:
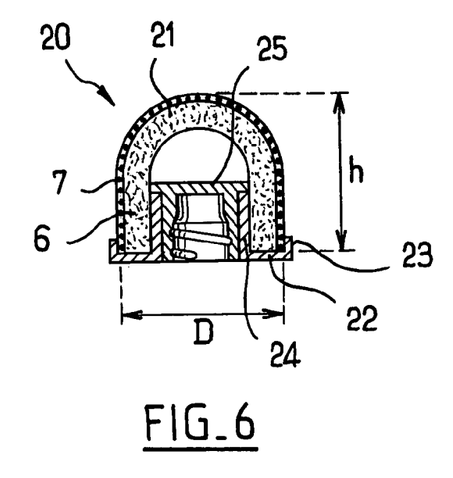
FIG. 6 is an axial section view of an exemplary embodiment of a cover element made in accordance with an aspect of the invention.

The invention is not limited to making a lipstick dispenser shell. For example, as shown in FIG. 6, the invention can be implemented to make a cover element such as a cover element 20 that is designed to be screwed onto a neck of a receptacle. As an example, the cover element 20 may comprise a shell element formed by a hollow body 21 made of composite material element 6, 7, in substantially the same manner as the above-described cover element 3. The hollow body 21 may be engaged in a mask 22 comprising a peripheral rim 23 and an inner chimney 24. The inner chimney 24 may be configured to receive an internally-threaded stopper 25 suitable for screwing onto the neck of a receptacle (not shown). It should be observed that the axial dimension h of the hollow body 21 is not less than its maximum diameter D, but other configurations might also be possible. In an alternative arrangement, the mask and the chimney may be formed integrally as a single piece.

Figure 7:
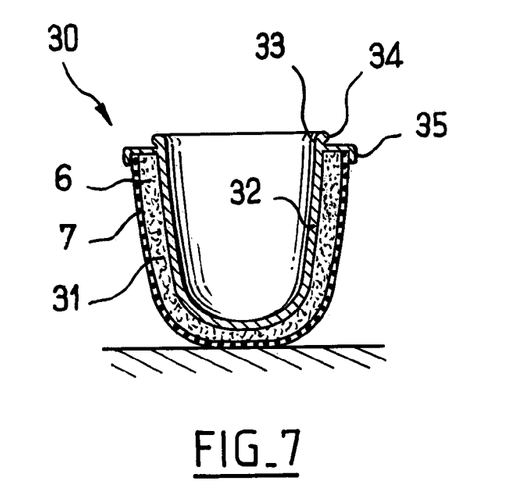
FIG. 7 is an axial section view of an exemplary embodiment of a receptacle made in accordance with an aspect of the invention.

It also may be possible to provide an outer shell element forming at least part of a receptacle, such as the receptacle 30 shown in FIG. 7, for example. The receptacle 30 may comprise an outer shell element including a hollow body 31 formed by a composite material element 6, 7 that has been thermocompressed or otherwise deformed. The receptacle 30 also may comprise an inner lining 32 defining the reservoir itself, which may be shaped to match the inside shape of the hollow body 31. The inner lining 32 may be configured to receive a product, for example a cosmetic product. At its top portion, the inner lining 32 may comprise an annular lip 33 provided with an indentation 34 at its periphery to enable a closure mechanism to be snap-fastened thereon. A downwardly-directed rim 35 designed to hide the top free edge of the hollow body 31 may extend from the top portion of the inner lining 32, forming a mask. It should be observed that the hollow body 31 may have a flat bottom so as to enable the receptacle to stand on a flat surface, as shown in FIG. 7.

Figure 8:
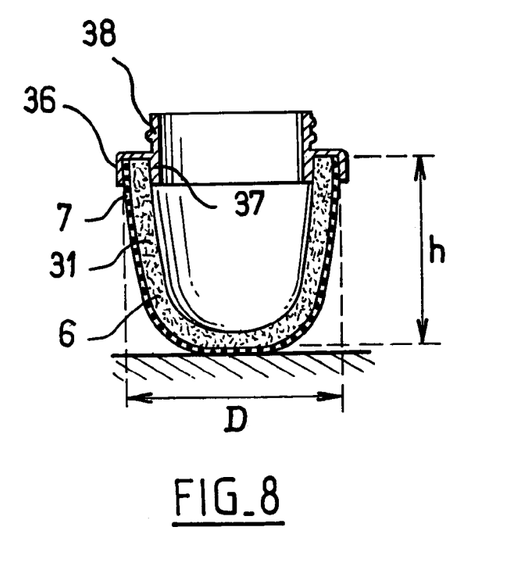
FIG. 8 is an alternative embodiment of the receptacle of FIG. 7.

As shown in FIG. 8, the hollow body 31 may itself also constitute the reservoir for holding a product. In this case, the top edge of the hollow body 31 may be received in the groove of a part 38 configured as a mounting for a cover element. The groove 38 may be formed between a rim 35 and an inner skirt 37. The skirt 37 may be provided with threading 38 enabling a closure mechanism associated with a cover element to be screwed thereon. As in the above-mentioned exemplary embodiments, the height h of the hollow body 31 may be not less than its maximum diameter D, for example the height h may be greater than the maximum diameter D.

Figure 9:
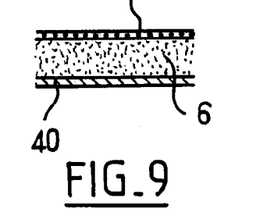
FIG. 9 is a cross-sectional view of another exemplary embodiment of a composite material element according to an aspect of the invention.

Other exemplary embodiments of the invention are shown in FIGS. 10 to 13. These embodiments use a composite material element, as shown in FIG. 9, which may comprise a foam layer 6 covered on a first face with a stretchable covering 7 and on a second, opposite face by a layer 40. The layer 40 may be made of a relatively rigid thermoformable material. The layer 40 may be, for example, a layer made of polyolefin, for example polyethylene.

Covering 7 and layer 40 may both be attached to foam layer 6, such as via adhesive, for example, or otherwise attached. For example, they may be simultaneously attached during the manufacturing of the composite material and before its deformation.

Layer 40 may be less thick than foam layer 6.

Figure 10:
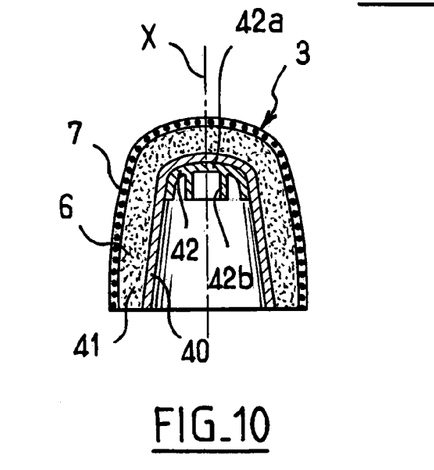
FIGS. 10 and 11 are axial section views of exemplary embodiments of cover elements made with the composite material element of FIG. 9.
Figure 11:
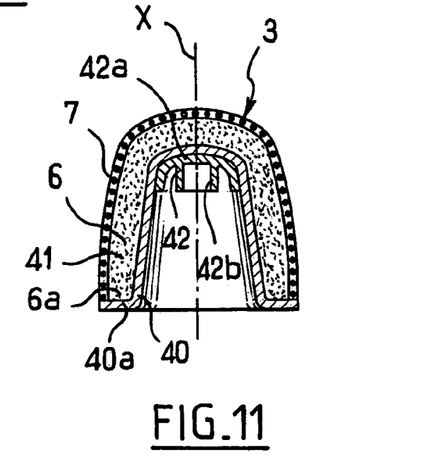

By thermoforming the composite material element, and by simultaneously deforming the different layers of the composite material element, a hollow body 41 forming a cover element 3, as shown in FIGS. 10 and 11, may be obtained.

An insert 10 in hollow body 41 may be omitted because layer 40 helps to provide structural support to the body, for example. A cap 42 may be fixed onto layer 40, for example by gluing, welding, or the like. This cap 42 may comprise, for example, a wall 42a configured to substantially conform to the shape of the bottom of hollow body 41 and a sealing skirt 42b. A mask 9, such as is shown in FIG. 2 also may be omitted, for example. In the exemplary embodiment of FIG. 11, layer 40 may comprise an end 40a deformed so as to cover free edge 6a of the composite material element 6. This deformed end 40a may be used as a mask and may improve the appearance of the hollow body. The portion 40a may cover only the foam layer 6 of section 6a or may cover both the foam layer 6 and the covering 7.

Figure 12:
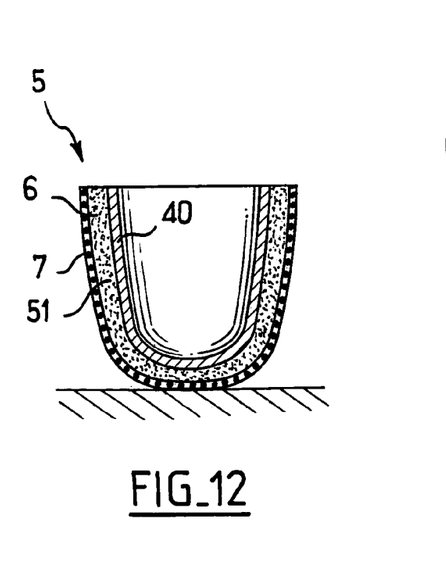
FIGS. 12 and 13 are axial section views of exemplary embodiments of receptacles made with the composite material element of FIG. 9.
Figure 13:
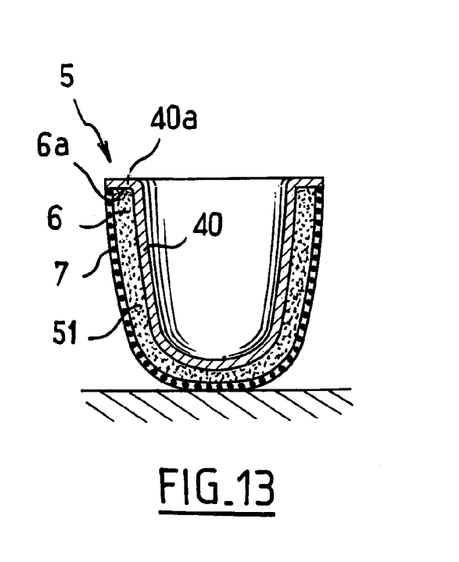

As shown in FIGS. 12 and 13, the composite material element of FIG. 9 may be used to form a hollow body 51 that constitutes a base portion (or receptacle) 5. Layer 40 may replace inner lining 32 shown in FIG. 7. In the exemplary embodiment of FIG. 13, the end 40a of layer 40 is deformed so as to cover section 6a of foam layer 6. Although not shown, it should be understood that a part similar to part 38 could be secured to the receptacles 5 shown in FIGS. 12 and 13. Such parts could be configured to engage with various cover elements to be used with the receptacles 5.

The invention is not limited to the examples described above. For example, the covering made of Lycra® can be replaced by other stretchable coverings, in particular other woven or knitted coverings, or by non-woven coverings. Similarly, the deformable layer can be made of other suitable deformable materials.

Further the hollow body may be used as an outer shell for a variety of articles other than those for containing and/or dispensing cosmetic products. Moreover, sizes of various structural parts and materials used to make these parts are illustrative and exemplary only and one of ordinary skill in the art would recognize that these materials and sizes can be changed as necessary to produce different effects or desired characteristics.

It will be apparent to those skilled in the art that various modifications and variations can be made to the structure and methodology. Thus, it should be understood that the invention is not limited to the examples discussed in the specification. Rather, the present invention is intended to cover modifications and variations.

What is claimed is:

1. A cosmetic product dispensing device, comprising:
a receptacle containing a cosmetic product; and
a cover element completely detachable from the receptacle;
wherein a portion of the device comprises:
    a hollow body having a maximum transverse dimension and an axial dimension that is not less than the maximum transverse dimension, the hollow body being made at least in part from a composite material element comprising:
        a deformable layer, and
        a stretchable covering attached to the deformable layer; and
    a mask;
    wherein a free edge of the hollow body defines an opening; and
    wherein the mask is configured to engage the free edge of the hollow body.

2. The device of claim 1, wherein the hollow body is one of cold-deformed and hot-deformed.

3. The device of claim 1, wherein the deformable layer is a thermally deformable layer.

4. The device of claim 3, wherein the deformable layer is one of a hot-deformable layer and a cold-deformable layer.

5. The device of claim 1, wherein the deformable layer comprises a foam layer that is in contact with the covering.

6. The device of claim 1, wherein the stretchable covering comprises a fabric.

7. The device of claim 6, wherein the fabric is a synthetic elastic material.

8. The device of claim 7, wherein the fabric has a substantially uniform color.

9. The device of claim 7, wherein the fabric comprises threads of differing colors.

10. The device of claim 1, wherein the mask comprises a ring-shaped element.

11. The article of claim 1, wherein the mask comprises a rim of an insert configured to be received within the hollow body.

12. The device of claim 1, further comprising a closure mechanism configured to be disposed in an interior of the hollow body.

13. The article of claim 12, wherein the closure mechanism is configured to be associated with an insert configured to be received in the interior of the hollow body.

14. The device of claim 12, wherein the closure mechanism is configured to close an opening of the receptacle.

15. The device of claim 14, wherein the closure mechanism is configured to cooperate with a dispensing mechanism of the receptacle.

16. The device of claim 1, wherein the hollow body is configured to form the cover element for the device.

17. The device of claim 16, wherein the product is adapted to be applied to at least one of skin, nails, lips, and hair.

18. The device of claim 17, wherein the product is chosen from a lip make-up product and a lip care product.

19. The device of claim 16, further comprising another hollow body having substantially the same configuration as the hollow body configured to form the cover element for the device.

20. The device of claim 1, wherein the axial dimension of the hollow body is greater than the maximum transverse dimension of the hollow body.

21. The device of claim 1, wherein the axial dimension of the hollow body is not less than approximately 2.5 cm.

22. The device of claim 1, wherein the maximum transverse dimension is a diameter of the hollow body.

23. The device of claim 22, wherein the maximum transverse dimension is less than approximately 2.5 cm.

24. The device of claim 22, wherein the hollow body has a free edge defining an opening and the maximum transverse dimension is a diameter of the opening.

25. The device of claim 1, wherein the hollow body is configured to form an outer shell for the cover element.

26. The device of claim 1, wherein the hollow body is configured to form an outer shell of the receptacle.

27. The device of claim 1, wherein the hollow body is configured to define a reservoir for holding the product.

28. The device of claim 1, wherein the deformable layer comprise a foam layer having closed cells.

29. The device of claim 1, wherein the deformable layer comprises a foam layer made of polyolefin.

30. The device of claim 29, wherein the foam layer is made of polyethylene.

31. The device of claim 30, wherein the polyethylene has a density greater than approximately 50 kg/m$^2$.

32. The device of claim 1, wherein the deformable layer comprises a first face to which the stretchable covering is attached and a second face opposite the first face.

33. The device of claim 32, further comprising at least one layer of a thermoformable material attached to the second face.

34. The device of claim 33, wherein the thermoformable material comprises polyolefin.

35. The device of claim 34, wherein the thermoformable material comprises polyethylene.

36. The device of claim 33, wherein the at least one layer is configured to at least partially cover at least a portion of a free edge of the hollow body.

37. The device of claim 33, further comprising a closure mechanism configured to be attached to the at least one layer such that the closure mechanism is disposed within an interior of the hollow body.

38. The device of claim 1, wherein the hollow body comprises an interior surface and an exterior surface and the stretchable covering forms the exterior surface.

39. The device of claim 1, wherein the composite material element is a substantially planar element and the hollow body is formed by deforming the composite material element.

40. The device of claim 39, wherein the hollow body is formed by one of hot-deforming and cold-deforming the composite material element.

41. The device of claim 1, wherein the receptacle defines at least one opening configured to be covered by the cover element, and wherein the hollow body forms at least a portion of the cover element.

42. The device of claim 41, further comprising a second hollow body, wherein the second hollow body forms at least a portion of the receptacle.

43. The device of claim 1, wherein the receptacle is defined at least partially by the hollow body.

44. The device of claim 1, wherein the product is adapted to be applied to at least one of skin, hair, nails, and lips.

45. The device of claim 44, wherein the product is chosen from a lip make-up product and a lip care product.

46. The device of claim 1, wherein the device is configured to dispense the cosmetic product.

47. The device of claim 46, wherein the device is configured to dispense the cosmetic product for application to at least one of skin, hair, fingernails, and lips.

48. The device of claim 47, wherein the device is configured to dispense one of a lip make-up product and a lip care product.

49. A cosmetic product dispensing article, comprising:
a cover element configured to be completely detachable from a receptacle;
wherein a portion of the article comprises:
a hollow body comprising a deformable layer and a stretchable covering attached to the deformable layer; and
a mask;
wherein a free edge of the hollow body defines an opening; and
wherein the mask is configured to engage the free edge of the hollow body; and
wherein the article further comprises a cosmetic product associated with the hollow body.

50. The article of claim 49, wherein the hollow body is one of cold-deformed and hot-deformed.

51. The article of claim 49, wherein the deformable layer is a thermally deformable layer.

52. The article of claim 51, wherein the deformable layer is one of a hot-deformable layer and a cold-deformable layer.

53. The article of claim 49, wherein the deformable layer comprises a foam layer that is in contact with the covering.

54. The article of claim 49, wherein the stretchable covering comprises a fabric.

55. The article of claim 54, wherein the fabric is a synthetic elastic material.

56. The article of claim 54, wherein the fabric has a substantially uniform color.

57. The article of claim 54, wherein the fabric comprises threads of differing colors.

58. The article of claim 1, wherein the mask comprises a ring-shaped element.

59. The article of claim 1, wherein the mask comprises a rim of an insert configured to be received within the hollow body.

60. The article of claim 1, further comprising a closure mechanism configured to be disposed in an interior of the hollow body.

61. The article of claim 60, wherein the closure mechanism is configured to be associated with an insert configured to be received in the interior of the hollow body.

62. The article of claim 60, wherein the receptacle is configured to hold the cosmetic product; and
wherein the closure mechanism is configured to close an opening of the receptacle.

63. The article of claim 62, wherein the closure mechanism is configured to cooperate with a dispensing mechanism of the receptacle.

64. The article of claim 49, wherein the receptacle contains the cosmetic product and the hollow body forms the cover element for the receptacle.

65. The article of claim 49, wherein the cosmetic product is a make-up product.

66. The article of claim 49, wherein the cosmetic product is adapted to be applied to at least one of skin, nails, lips, and hair.

67. The article of claim 66, wherein the product is chosen from a lip make-up product and a lip care product.

68. The article of claim 64, wherein at least a portion of the receptacle is formed by another hollow body having substantially the same configuration as the hollow body forming the cover element for the receptacle.

69. The article of claim 49, wherein the axial dimension of the hollow body is greater than the maximum transverse dimension of the hollow body.

70. The article of claim 49, wherein the receptacle is configured to hold the cosmetic product; and wherein the hollow body is configured to form an outer shell for the receptacle.

71. The article of claim 49, wherein the receptacle is configured to hold the cosmetic product; and wherein the hollow body is configured to define the reservoir.

72. The article of claim 49, wherein the deformable layer comprises a foam layer having closed cells.

73. The article of claim 49, wherein the deformable layer comprises a foam layer made of polyolefin.

74. The article of claim 73, wherein the foam layer is made of polyethylene.

75. The article of claim 74, wherein the polyethylene has a density greater than approximately 50 kg/m$^2$.

76. The article of claim 49, wherein the deformable layer comprises a first face to which the stretchable covering is attached and a second face opposite the first face.

77. The article of claim 76, further comprising at least one layer of a thermoformable material attached to the second face.

78. The article of claim 77, wherein the thermoformable material comprises polyolefin.

79. The article of claim 78, wherein the thermoformable material comprises polyethylene.

80. The article of claim 77, wherein the at least one layer is configured to at least partially cover at least a portion of a free edge of the hollow body.

81. The article of claim 77, further comprising a closure mechanism configured to be attached to the at least one layer such that the closure mechanism is disposed within an interior of the hollow body.

82. The article of claim 49, wherein the hollow body comprises an interior surface and an exterior surface and the stretchable covering forms the exterior surface.

83. The article of claim 49, wherein the composite material element is a substantially planar element and the hollow body is formed by deforming the composite material element.

84. The article of claim 83, wherein the hollow body is formed by one of hot-deforming and cold-deforming the composite material element.

* * * * *

UNITED STATES PATENT AND TRADEMARK OFFICE
CERTIFICATE OF CORRECTION

PATENT NO. : 7,441,656 B2 Page 1 of 1
APPLICATION NO. : 10/192718
DATED : October 28, 2008
INVENTOR(S) : Laure Bourjal It is certified that error appears in the above-identified patent and that said Letters Patent is hereby corrected as shown below:

On the title page, item (75), "Laur Bourjal," should read --Laure Bourjal,--.

In claim 58, column 10, line 35, "claim 1," should read --claim 49,--.

In claim 59, column 10, line 37, "claim 1," should read --claim 49,--.

In claim 60, column 10, line 40, "claim 1," should read --claim 49,--.

Signed and Sealed this

Thirteenth Day of January, 2009

JON W. DUDAS
*Director of the United States Patent and Trademark Office*